Feb. 7, 1928.

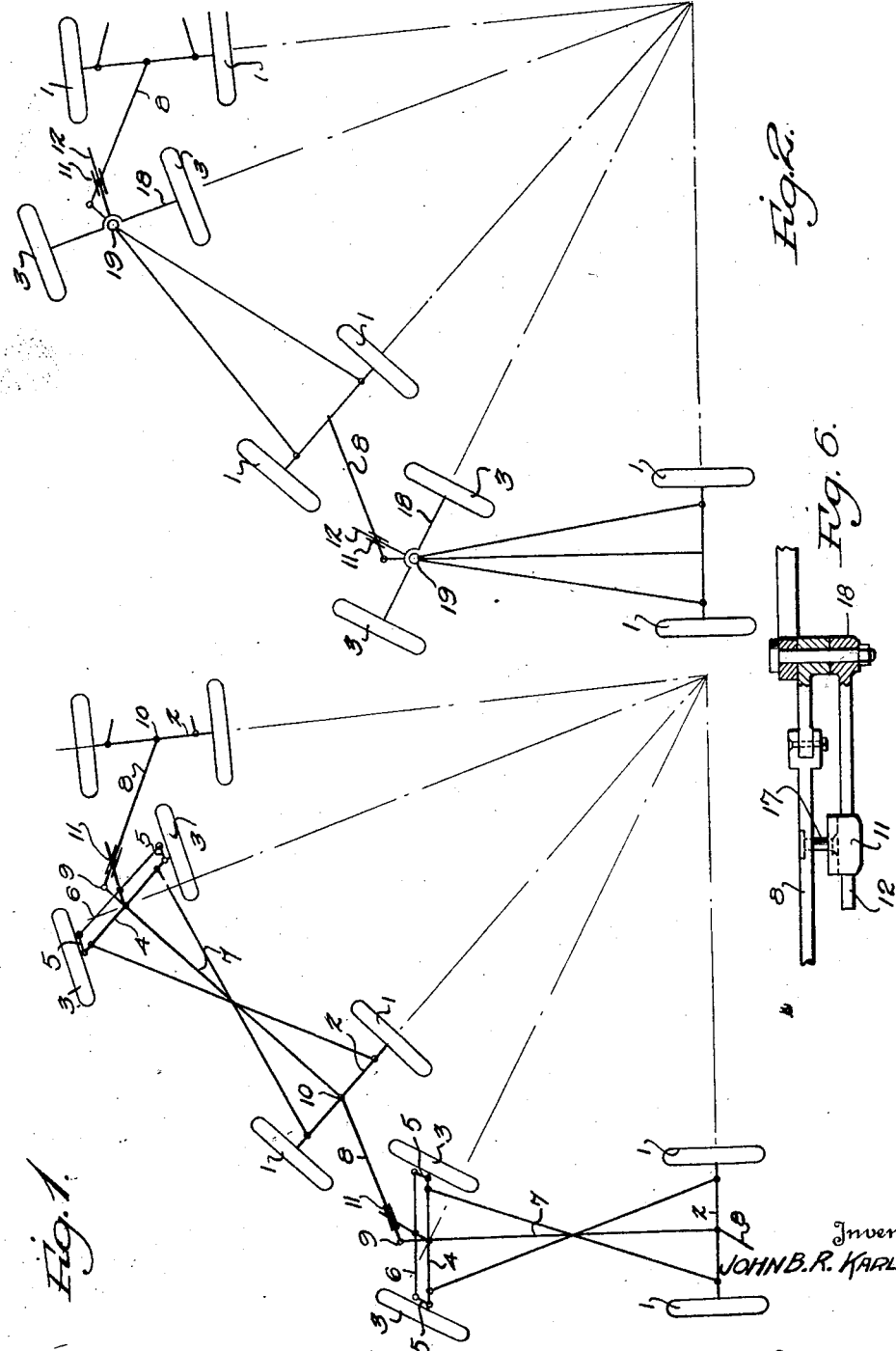

J. B. R. KARLSSON

COUPLER FOR TRAILERS

Filed Oct. 5, 1925

1,658,203

2 Sheets-Sheet 2

Inventor
JOHN B.R. KARLSSON

By
Attorney

Patented Feb. 7, 1928.

1,658,203

UNITED STATES PATENT OFFICE.

JOHN BERTIL RUDOLF KARLSSON, OF WISCONSIN RAPIDS, WISCONSIN.

COUPLER FOR TRAILERS.

Application filed October 5, 1925. Serial No. 60,665.

This invention relates to couplings and more particularly to couplings for trailers or vehicle trains of the trackless type.

An object of the invention is the provision of a trailer vehicle coupler by means of which one vehicle may be connected to another and steered by the movement of the preceding vehicle.

A further object is the provision of apparatus of this type that is simple in construction, formed of relatively few parts and is unlikely to get out of order.

Figure 3:
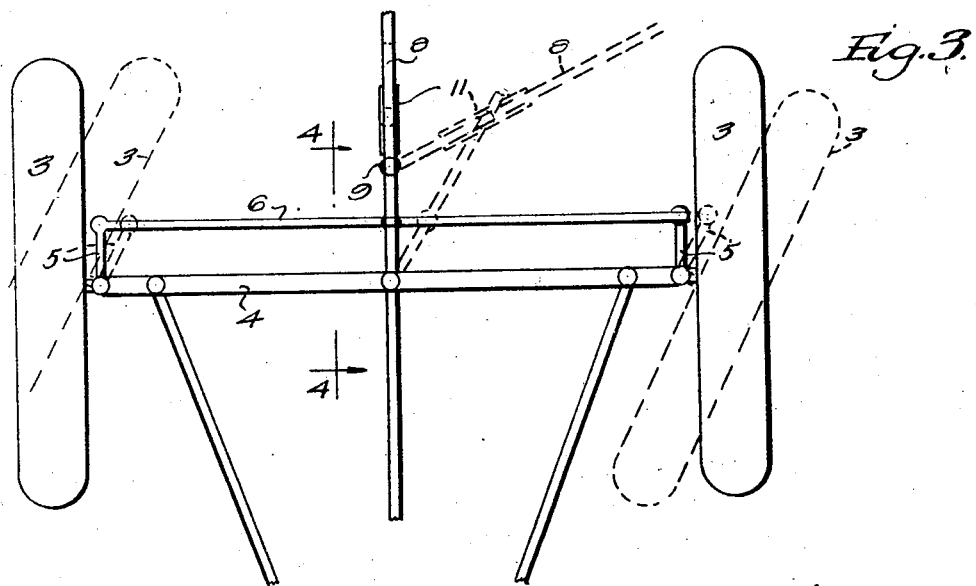
Figure 4:
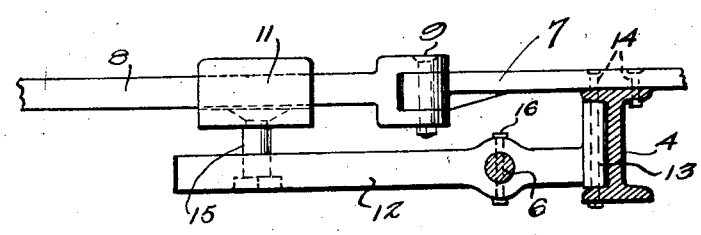

In the accompanying drawings I have shown several embodiments of the invention. In this showing, Figure 1 is a diagrammatic view of one form of the invention, Figure 2 is a similar view of another form of the invention, Figure 3 is an enlarged plan view of the front end of the trailer shown in Figure 1 of the drawings, Figure 4 is a detail sectional view on line 4—4 of Figure 3, Figure 5 is an enlarged plan view of the front end of the trailer shown diagrammatically in Figure 2 of the drawings, and Figure 6 is a detail sectional view on line 6—6 of Figure 5.

Referring to Figure 1 of the drawings, the reference numeral 1 designates the rear wheels of a motor vehicle mounted on an axle 2. The front of the vehicle is provided with wheels 3 mounted on stub axles carried by a main front axle 4. The stub axles are provided with steering members 5 of the usual type connected by a steering rod 6. This is the usual construction of the running gear of a motor vehicle in which steering is effected by turning the front wheels.

In providing the coupling forming the subject matter of the present invention a draw bar 7 is arranged longitudinally of the vehicle and preferably projects beyond the front axle. A connecting member 8 is pivotally connected to the draw bar as at 9 and the forward end of this connecting member is pivotally connected to the rear axle of the preceding vehicle as at 10. A slide 11 is mounted on this connecting member. As shown, in Figures 3 and 4 of the drawings, the slide may consist of a metal member suitably shaped to embrace or partially embrace the connecting member and permit longitudinal movement of the slide. A steering member 12 (see Fig. 4) is pivotally mounted on the front axle and connected to the slide. As shown, this member is provided with a sleeve 13 at its inner end adapted to receive a pivot pin 14 carried by the axle. The forward end of the steering member is provided with a pin 15 connected to the slide. Intermediate the pins 13 and 15 the steering member is connected to the steering rod 6 by means of a pin 16.

Figure 5:
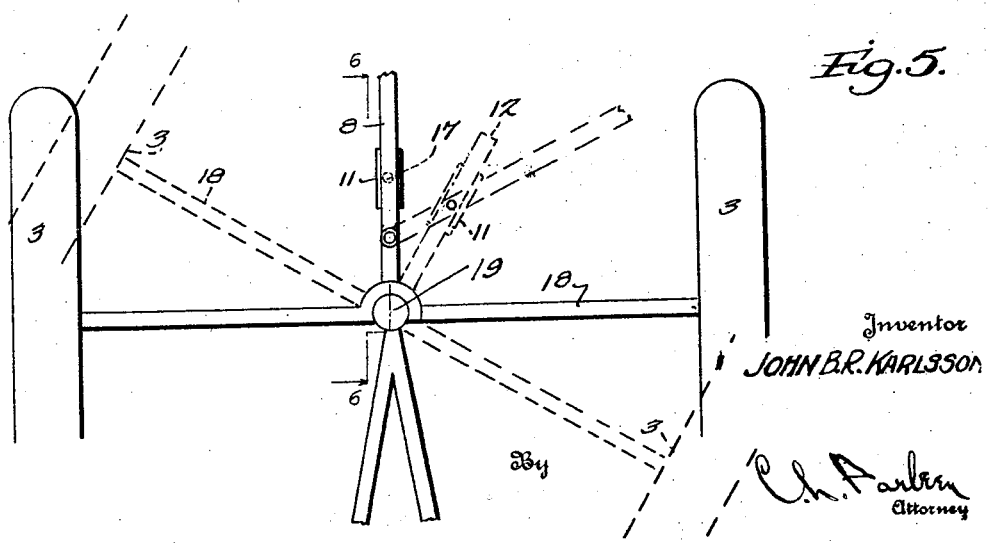

In the form of the invention shown in Figures 2, 5 and 6 of the drawings, the construction and operation is essentially the same. In this form of the invention however I have shown the slide 11 pivotally mounted on the connecting member 8 and adapted to slidably receive the steering rod 12. As shown the slide is secured to the connecting member by means of a pin 17. In this form of the invention I have also illustrated a vehicle in which the front wheels 3 are not movable with respect to the front axle and steering is effected by turning the entire axle on a pivot as in the ordinary wagon construction. As shown, the axle 18 is pivotally mounted on a king bolt 19. In this form of the invention the connection between the steering rod and the front axle is rigid instead of pivoted as in the form where the transverse steering rod 6 of the vehicle is connected to the steering member 12.

The operation of the device will be apparent from the foregoing description. In the form of the invention shown in Figure 1 of the drawings movement of the front vehicle in either direction causes the connecting member 8 to assume an angular position and causes the slide 11 to move on the connecting member. The steering member 12 being connected to the slide as shown in Figure 4 of the drawings, swings on an arc of a circle about the pin 14 as a pivot and thus moves the vehicle steering rod 6 to either side turning the wheels in the proper direction. In the form of the invention shown in Figure 2 of the drawings the operation is essentially the same except the slide 11 merely swings in an arc of a circle when the connecting member 8 moves and the steering member 12 moves in the slide. The steering member 12 is swung in an arc of a circle and thus swings the front axle 18 on its pivot to turn the wheels in the desired direction.

It is to be understood that the forms of my invention herewith shown and described are to be taken as preferred examples of the same, and that various changes in the shape, size, and arrangement of parts may be resorted to without departing from the spirit of the invention or the scope of the subjoined claim.

I claim:

A coupler for vehicle trains formed of vehicles having front wheels capable of being turned on vertical pivots for steering and connected to each other by a transverse steering rod, a draw-bar carried by the rear vehicle and extending forwardly beyond the vertical plane of the pivots of the steering wheels, a connecting member pivotally connected to said draw-bar and connected to the preceding vehicle, a steering member pivotally mounted on the front axle of the rear vehicle and having an opening therethrough at a point forward of the front axle of the rear vehicle and having said transverse steering rod extending through said opening and pivotally connected to said steering member, an upright pin located adjacent the forward end of said steering member, a slide connected to said pin, an opening in said slide, and a sliding connection between said connecting member and said slide.

In testimony whereof I affix my signature.

JOHN BERTIL RUDOLF KARLSSON.